US007326661B2

(12) United States Patent  
Sultan

(10) Patent No.: US 7,326,661 B2
(45) Date of Patent: Feb. 5, 2008

(54) FIBERGLASS FABRIC FLOORING SYSTEM

(75) Inventor: Joseph Sultan, New York, NY (US)

(73) Assignee: Chilewich L.L.C., New York, NY (US)

( * ) Notice: Subject to any disclaimer, the term of this patent is extended or adjusted under 35 U.S.C. 154(b) by 357 days.

(21) Appl. No.: 11/029,973

(22) Filed: Jan. 5, 2005

(65) Prior Publication Data

US 2005/0255775 A1 Nov. 17, 2005

Related U.S. Application Data

(60) Provisional application No. 60/571,665, filed on May 14, 2004.

(51) Int. Cl.
B32B 11/00 (2006.01)
B32B 27/12 (2006.01)
D03D 15/00 (2006.01)

(52) U.S. Cl. .................. 442/178; 442/210; 442/288; 428/913.3

(58) Field of Classification Search ............ 428/105; 442/60, 155, 148, 178, 180, 181, 210, 288
See application file for complete search history.

(56) References Cited

U.S. PATENT DOCUMENTS 2,857,654 A * 10/1958 Sexton ............ 442/206
3,022,210 A    2/1962  Philipps
3,090,102 A    5/1963  Jannarelli
3,091,017 A    5/1963  Wetterau
3,100,926 A    8/1963  Richmond
3,274,136 A    9/1966  Glesner et al.
3,323,975 A    6/1967  Marzocchi et al.
3,515,622 A    6/1970  Jordan
3,579,409 A    5/1971  Shannon
3,623,937 A   11/1971  Gasaway
3,627,620 A   12/1971  Gasaway
3,720,571 A    3/1973  Caroselli et al.
3,733,239 A    5/1973  George
3,734,990 A    5/1973  Glesner
3,883,473 A    5/1975  Kucsma
3,913,309 A   10/1975  Chiarotto
4,746,565 A    5/1988  Bafford
5,540,980 A    7/1996  Tolbert et al.

(Continued)

FOREIGN PATENT DOCUMENTS

JP    55014250 A    1/1980

(Continued)

Primary Examiner—Lynda Salvatore
(74) Attorney, Agent, or Firm—Gottlieb, Rackman & Reisman

(57) ABSTRACT

A hybrid of vinyl flooring and soft cushioned carpet is provided. The hybrid flooring, which is suitable for production into tiles, utilizes woven PVC fabric that is bonded to a flexible backing. The fabric comprises woven solid color and/or multi-color yarns in order to produce different visual styles. These yarns comprise a ceramic fiber core, preferably fiberglass, onto which PVC is extruded in order to form a PVC jacket. The core provides the yarn with sufficient tensile strength so it can be woven while the PVC provides durability, resistance to wear and color. After the fabric is woven, it is sent through a tentering or curing oven which fuses the warp and fill yarns of the fabric, thereby stabilizing the fabric, preserving its integrity and preventing it from unraveling.

28 Claims, 2 Drawing Sheets

U.S. PATENT DOCUMENTS

| | | |
|---|---|---|
| 5,759,924 A | 6/1998 | Sahlin |
| 5,763,043 A | 6/1998 | Porter et al. |
| 6,013,329 A | 1/2000 | Berenger |
| 6,162,748 A | 12/2000 | Schilling et al. |
| 6,406,574 B1 | 6/2002 | Hammel et al. |
| 2002/0137410 A1 | 9/2002 | Porter et al. |
| 2003/0139109 A1* | 7/2003 | Johnson et al. ............ 442/149 |
| 2004/0198120 A1 | 10/2004 | Scott et al. |

FOREIGN PATENT DOCUMENTS

| | | |
|---|---|---|
| JP | 1085399 A | 3/1989 |
| JP | 6064108 A | 3/1994 |
| JP | 9041240 A | 2/1997 |
| JP | 1088498 A | 4/1998 |
| JP | 2003073990 A | 3/2003 |

* cited by examiner

FIBERGLASS FABRIC FLOORING SYSTEM

This application claims priority benefit of provisional application No. 60/571,665, filed May 14, 2004.

BACKGROUND OF THE INVENTION

The invention is directed to a new type of resilient tile flooring, which is essentially a hybrid of a hard surfaced long-wearing vinyl flooring and a soft cushioned carpet.

Floor coverings are used in both residential and commercial buildings. For durability, hard surfaced floor coverings are used, such as vinyl flooring, ceramic and marble. Such floor coverings are typically long lasting and easy to clean or mop, but are "hard" on one's feet. Carpeting, on the other hand, and which may be tufted or woven, is soft to walk on, but is less durable and may be both difficult and expensive to clean.

A hybrid of vinyl flooring and carpet has been available for several years and comprises woven PVC (polyvinylchloride) fabric bonded to a backing. The fabric is made of a polyester core and a PVC cover or jacket.

However, the use of a polyester core for fabric tiles is not completely advantageous. While polyester is suitable if the flooring is sold in a roll form, the tile form has the disadvantage of the polyester coming out along the edges of the individual tiles during wear; in other words, the polyester begins to rip out of the PVC jacket through normal everyday wear and foot traffic. This phenomenon is known as "fuzzing."

To correct this problem, ultrasonic cutters have been utilized to melt the polyester, but have been found not to be accurate enough. Laser cutters have also been attempted, but a laser cutter would typically burn the edge of the tiles and leave a singed edge. The most obvious solution would be to glue the edge of the tiles once they are placed down as a flooring, but this could be very difficult and time consuming; moreover, the glue would likely break down over time. Gluing also defeats the intent of easily replacing tile for maintenance or other purposes.

Accordingly, it would be desirable to produce a woven PVC flooring which may be backed to a backing, and which overcomes these disadvantages.

SUMMARY OF THE INVENTION

Generally speaking, in accordance with the invention, a hybrid of vinyl flooring and soft cushioned carpet is provided. The hybrid flooring utilizes woven PVC fabric that is bonded to a flexible backing. The fabric comprises woven solid color and/or multi-color yarns in order to produce different visual styles. These yarns comprise a ceramic fiber core, preferably fiberglass, onto which PVC is extruded in order to form a PVC jacket. The core provides the yarn with sufficient tensile strength so it can be woven while the PVC provides durability, resistance to wear and color. After the fabric is woven, it is sent through a tentering or curing oven which fuses the warp and fill yarns of the fabric, thereby stabilizing the fabric, preserving its integrity and preventing it from unraveling.

Significantly, the fiberglass core is brittle (substantially weaker than polyester) and therefore does not "fuzz"—in other words, it easily breaks off from the edges of the tiles if it is exposed during normal wear, thereby maintaining a neat physical appearance.

The inventive floor is abrasion resistant, and it does not show or exhibit any surface dullness, surface attack or color change when exposed to household chemicals.

Accordingly, it would be desirable to provide an improved flooring system.

Another object of the invention is to provide a flooring system which provides a cushioned underfoot, yet is both durable and wipeable.

A further object of the invention is to provide a flooring system which can be produced in tile form.

Still other objects and advantages of the invention will be apparent from the following description.

DESCRIPTION OF THE DRAWINGS

For a fuller understanding of the invention, reference is made to the following description, taken with the accompanying drawings, in which.

DETAILED DESCRIPTION

Figure 1:
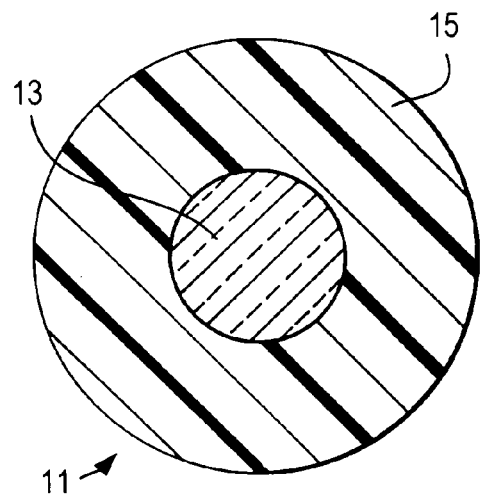
FIG. 1 is a cross-sectional view of the yarn used in connection with producing the fabric of the invention.
Figure 3:
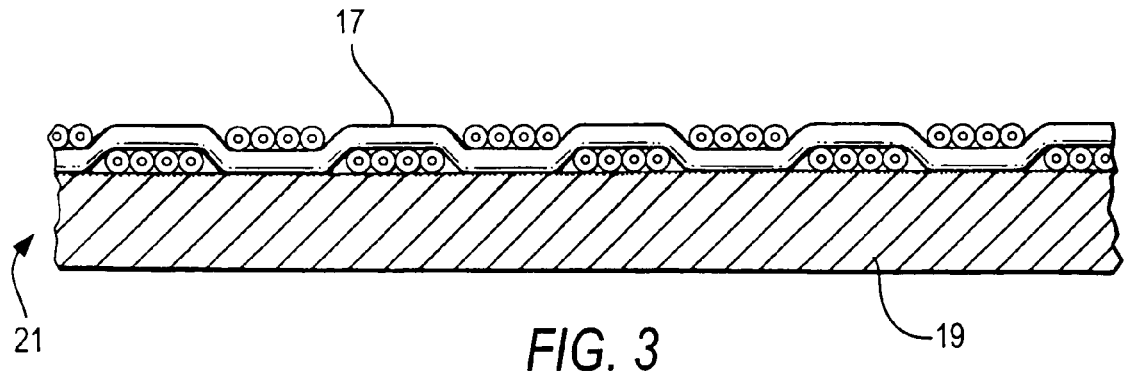
FIG. 3 is a cross-sectional view of the inventive flooring.

The invention, in its preferred form, utilizes a PVC coated fiberglass core or another ceramic core which is woven into fabric. The core is produced by drawing a fiberglass yarn or other ceramic yarn through an extrusion head, as is well known, where it is coated with a PVC jacket. The resulting yarn, as shown in FIG. 1 at 11, comprises a ceramic core 13 and a PVC jacket 15. The yarns are conventionally woven into a fabric 17, which is bonded to a backing 19 in order to produce flooring 21, as shown in FIG. 3.

Figure 2:
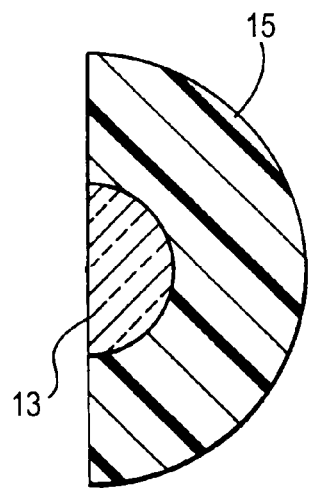
FIG. 2 is a partial cross-sectional view similar to FIG. 1 and showing the yarn when cut.
Figure 4:
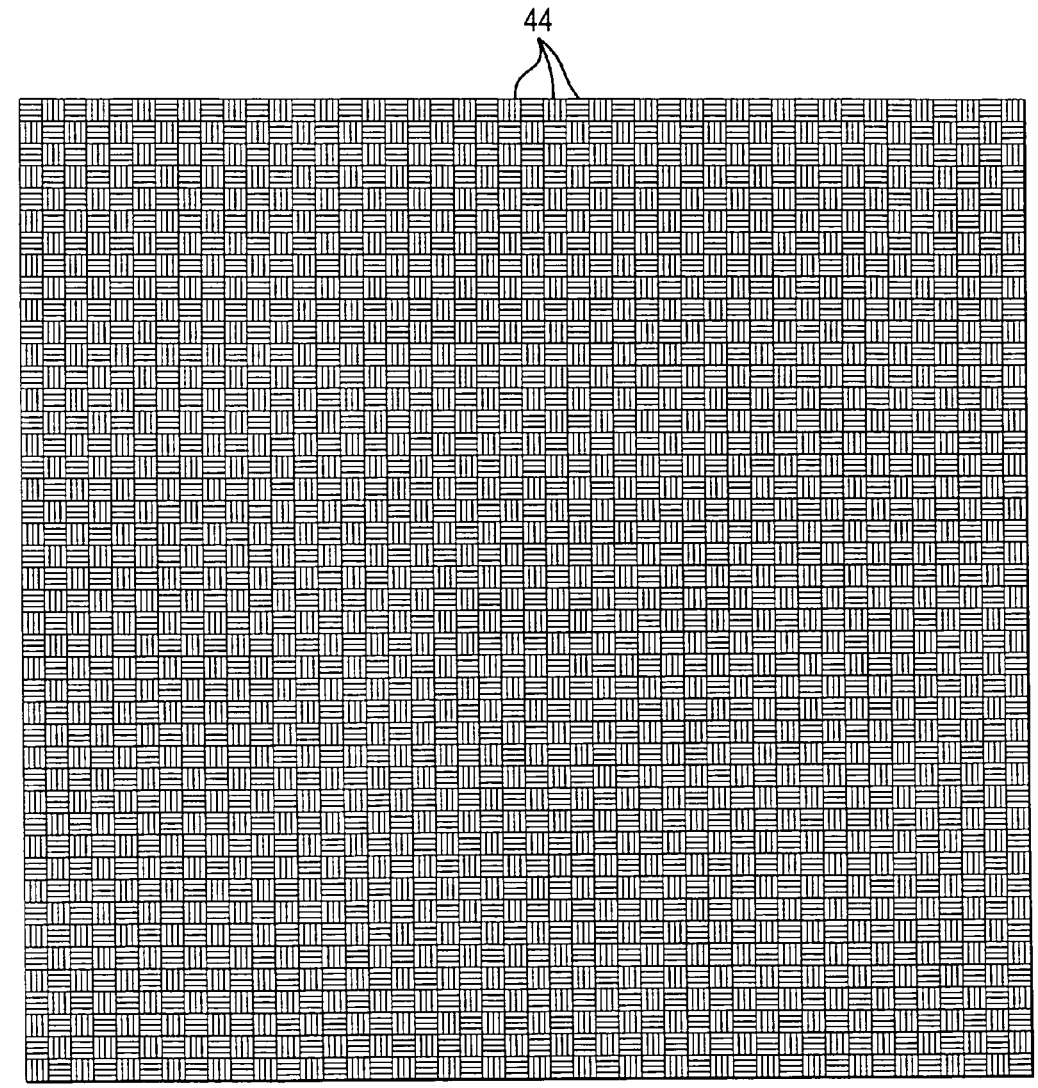
FIG. 4 is a top plan view of the inventive flooring.

After backing the fabric, it is cut into conventional square and/or rectangular tiles, as, for example, at 23 in FIG. 4. Because the ceramic yarn core is brittle, it easily breaks away from the edges of the tiles (See FIG. 2), maintaining a neat physical appearance.

In production, because the surface of the ceramic core 15 is very smooth, the interface between the ceramic core and the coating or jacket typically incorporates a resin binder or similar type of binder product. Suitable binders include resins, such as polyester resins, vinyl esters, epoxies and phenolic resins, as well as non-starch oil binders, the latter an example of which is made by PPG of Pittsburgh, Pa. and sold under the name "DDS."

Alternatively, textured fiberglass or other ceramic yarns may be used; textured fiberglass is prepared by running the fiberglass filaments through an air blast while the yarn is hot, thereby forming various kinks therealong and otherwise bulking up the filament bundle.

In accordance with the invention, the fiberglass or other ceramic yarn will have a yarn breaking tenacity-knot configuration (expresses brittleness) of between about 0.05 and 1.0 gf/denier avg. In comparison, polyester yarns will have a yarn breaking tenacity-knot configuration that is far greater, ranging between about 3.0 and 5.0 gf/denier avg. Thus, it is advantageous to use a ceramic yarn since it will break-off more easily than polyester when producing individual flooring tiles.

In addition, the strain-to-fail percentage of ceramic yarns is between about 1.5% and 2.5%, in contrast to using a polyester yarn which has a strain-to-fail percentage of between about 5% and 30%. Thus, a ceramic such as fiberglass is far better to use since it is far more likely to break-off during normal use.

While the backing of the inventive tile flooring system may be of any suitable flexible material, such as, for example, a polyurethane or latex backing, which is normally glued to the fabric and thereby often breaks down, the preferred backing is a PVC backing. This enables a hot bonding of the PVC coated fiberglass woven yarns to the PVC backing; this system produces an integrated relationship between the fabric and the backing, resulting in an intimate adhesion effect.

The fiberglass or other ceramic yarns that are used for the inventive fabric have a diameter of preferably between about 5 and 15 mills with a tensile strength of between about 250,000 and 700,000 lbs./inch squared (polyester yarns have a much lower tensile strength, normally between about 50,000 and 125,000 lbs./inch squared). Moreover, the PVC coating extruded around the glass yarns have a coating thickness of between about 3 and 10 mills. The overall diameter of the PVC coated yarn is in a range between about 15 and 30 mills.

Furthermore, the inventive fabric has a thickness ranging between about 25 and 60 mills, and the backing (preferably PVC backing) has a thickness ranging between about 62.5 and 250 mills.

The fiberglass or other ceramic yarns that are used in the inventive fabric will have a tenacity of between about 6 and 9 grams/denier. This is the load required to rupture the fibers, which, in comparison to polyester, is much less, facilitating its ability to break-off. They will also have a loop strength of between about 0.8 and 1.2 grams/denier and a knot strength of between about 1.5 and 2.5 grams/denier. In comparison, the loop strength of polyester yarns ranges from 1.5 to 4.0 grams/denier and the knot strength from 3.0 to 7.0 grams/denier. Thus, it is advantageous to use a ceramic yarn since it will break off more easily than polyester. The density or specific gravity of the ceramic yarns will be in a range of between about 2.5 and 3.0 grams/cubic centimeter (the density of polyester yarns is typically half that amount). And the modulus of extension, the load required to produce a unit extension in the yarns, is between 8,000,000 and 12,000,000 lbs./inch squared for the ceramic yarns of the inventive fabric; the modulus of extension for polyester yarns is much, much smaller.

Flexural rigidity or flex stiffness measures the resistance to the fiber bending. It is the effort necessary to bend the yarns into a unit curvature or angle. Glass or any other ceramic yarns require between about 15 and 25 times more effort or force to bend the yarns than polyester of the equivalent size. As a result, ceramic yarns are more suitable for the inventive flooring system since they are far more resistant to bending, and therefore more likely to break off from the edges of the tiles.

Because glass or other ceramic yarns have a density that is almost double that of polyester, as alluded to above, a glass yarn bundle will have a much smaller volume or bulk than polyester of the same denier size. In this regard, each yarn of fiberglass that is used is typically in bundled multifilament form comprising a plurality of constituent fiber filaments ranging from between about 10 and 1,000 in number, depending upon the denier of the fiberglass yarn and denier of each individual filament.

Preferably, the fiberglass yarn will have a fineness ranging between about 40,000 yds./lb. (400 glass) and 2,000 yds./lb. (20 glass). Since denier=4,464,492 divided by yds./lb. of the yarn, the fiberglass yarns of the inventive fabric have a denier which ranges from between about 110 and 2,200. Moreover, the individual filaments in the yarns have a denier range between about 2 denier/per filament and 10 denier/per filament. Denier of course relates to yarn length and weight.

As alluded to, while fiberglass is preferred for use in the inventive fabric, other ceramic fibers may be used such as quartz, silica and aluminum oxide. The preferred fiberglass is "E" glass (electric insulation glass), but "C" glass (a specialty glass) and "A" glass (also a specialty glass) may also be used. "E" glass is preferred since it is typically more readily available in numerous sizes, filament counts and cross-sections.

In accordance with the invention, all methods of weaving would be suitable, including dobby, jacquard and plain weaving and there would be no limit to the designs achievable with these standard weaving techniques.

The yarn of the invention is woven preferably into a 25×25 warp/weft ends per inch mesh, although this can range from between about 10×42 warp/weft ends per inch mesh and 30×30 warp/weft ends per inch mesh, or any other mesh configuration that standard weaving equipment can normally produce.

While the inventive flooring system and fabric have been described in detail herein, the invention is not limited to what is described. Moreover, the scope of the invention is defined in the claims.

The invention claimed is:

1. A flooring system comprising a fabric defined by a plurality of woven yarns, each yarn including a brittle material that breaks away when exposed, said material comprising a ceramic core, and each yarn also including an extruded polyvinyl chloride (PVC) jacket; and
   a backing to which said fabric is bonded, said backing being constructed to support said flooring system on a floor;
   wherein said core is bonded to said jacket by means of a binder selected from the group consisting of resins and non-starch oil binders.

2. The system of claim 1, wherein said ceramic core is selected from the group consisting of fiberglass, quartz, silica and aluminum oxide.

3. The system of claim 1, wherein said ceramic core is textured.

4. The system of claim 1, wherein said backing is selected from the group consisting of PVC, polyurethane and latex.

5. The system of claim 1, wherein the ceramic core has a diameter of between about 5 and 15 mills.

6. The system of claim 1, wherein the ceramic core has a tensile strength of between about 250,000 and 700,000 lbs./inch.

7. The system of claim 1, wherein the PVC jacket has a thickness of between about 3 and 10 mills.

8. The system of claim 1, wherein each of said woven yarns has a diameter in a range between about 15 and 30 mills.

9. The system of claim 1, wherein the fabric has a thickness ranging between about 25 and 60 mills.

10. The system of claim 1, wherein the backing has a thickness ranging from between about 62.5 and 250 mills.

11. The system of claim 1, wherein the ceramic core has a tenacity of between about 6 and 9 grams/denier.

12. The system of claim 1, wherein said ceramic core has a loop strength of between about 0.8 and 1.2 grams/denier and a knot strength of between about 1.5 and 2.5 grams/denier.

13. The system of claim 1, wherein said ceramic core has a density in a range of between about 2.5 and 3.0 grams/cubic modulus of extension.

14. The system of claim 1, wherein said ceramic core will have a modulus of extension between 8,000,000 and 12,000,000 lbs./inch squared.

15. The system of claim 1, wherein said ceramic core comprises a bundled multifilament form defined by a plurality of constituent fiber filaments ranging from between about 10 and 1,000 in number.

16. The system of claim 1, wherein the ceramic core will have a fineness ranging between about 40,000 yds./lb. (400 glass) and 2,000 yds./lb. (20) glass.

17. The system of claim 1, wherein the ceramic core has a denier which ranges from between about 110 and 2,200.

18. The system of claim 15, wherein each said filament has a denier range between about 2 denier/per filament and 10 denier/per filament.

19. The system of claim 1, wherein said fabric is woven into a mesh configuration.

20. The system of claim 1, wherein said yarns of said fabric are hot bonded to said backing.

21. A decorative floor surface covering comprising a fabric formed of a plurality of yarns, each yarn comprising a textured ceramic core with a polyvinyl chloride (PVC) jacket, and a backing supporting said fabric on a surface.

22. The covering of claim 21 wherein said core is selected form the group consisting of fiberglass, quartz, silica and aluminum oxide.

23. The covering of claim 21 wherein said fabric is bonded to said backing.

24. The covering of claim 21 wherein said yarn has a breaking tenacity of no more than 1.0 gf/denier avg.

25. The covering of claim 21 wherein said yarn is an extrude yarn.

26. A flooring system comprising a fabric defined by a plurality of woven yarns, each including a ceramic core and an extruded polyvinyl chloride (PVC) jacket; and a backing to which said fabric is bonded;

wherein said ceramic core is bonded to said jacket by means of a binder.

27. A flooring system comprising a fabric defined by a plurality of woven yarns, each including a ceramic core and an extruded polyvinyl chloride (PVC) jacket; and a backing to which said fabric is bonded;

wherein said ceramic core is textured.

28. The covering of claim 21 wherein the ceramic core is bonded to said PVC jacket.

* * * * *